(12) United States Patent
Yang et al.

(10) Patent No.: US 9,102,789 B2
(45) Date of Patent: Aug. 11, 2015

(54) SULFONATED POLY(PHENYLENE) COPOLYMER ELECTROLYTE FOR FUEL CELLS

(71) Applicants: Daimler AG, Stuttgart (DE); Ford Motor Company, Dearborn, MI (US)

(72) Inventors: Yunsong Yang, Surrey (CA); Yuquan Zou, Richmond (CA); Jing Li, Surrey (CA); Keping Wang, Richmond (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 387 days.

(21) Appl. No.: 13/660,068

(22) Filed: Oct. 25, 2012

(65) Prior Publication Data

US 2013/0108944 A1    May 2, 2013

Related U.S. Application Data

(60) Provisional application No. 61/553,149, filed on Oct. 28, 2011.

(51) Int. Cl.

| | |
|---|---|
| *C08G 14/00* | (2006.01) |
| *C08G 61/10* | (2006.01) |
| *H01M 8/10* | (2006.01) |
| *C08G 61/02* | (2006.01) |
| *C08G 61/12* | (2006.01) |
| *C08J 5/22* | (2006.01) |

(52) U.S. Cl.
CPC ................ *C08G 61/10* (2013.01); *C08G 61/02* (2013.01); *C08G 61/12* (2013.01); *C08J 5/2256* (2013.01); *H01M 8/1023* (2013.01); *H01M 8/1032* (2013.01); *C08G 2261/12* (2013.01); *C08G 2261/126* (2013.01); *C08G 2261/148* (2013.01); *C08G 2261/1428* (2013.01); *C08G 2261/1452* (2013.01); *C08G 2261/312* (2013.01); *C08G 2261/344* (2013.01); *C08G 2261/3424* (2013.01); *C08G 2261/516* (2013.01); *C08J 2365/02* (2013.01); *H01M 8/1039* (2013.01); *H01M 2008/1095* (2013.01); *H01M 2300/0082* (2013.01); *Y02E 60/521* (2013.01)

(58) Field of Classification Search
CPC ..................... C08G 18/0828; C08G 2261/516; C08G 2261/1452; C08G 2261/722; H01B 1/122; H01M 8/1025
USPC ............ 528/125, 171, 295, 220, 27, 373, 370
See application file for complete search history.

(56) References Cited

U.S. PATENT DOCUMENTS

| | | | | |
|---|---|---|---|---|
| 2006/0106190 | A1* | 5/2006 | Balland-Longeau et al. | .. 528/86 |
| 2008/0207781 | A1* | 8/2008 | Schuster et al. | ............... 521/27 |
| 2009/0149623 | A1* | 6/2009 | Higami et al. | ............... 528/125 |
| 2010/0105786 | A1* | 4/2010 | Onodera et al. | ............... 521/27 |
| 2012/0302725 | A1* | 11/2012 | Teasley | ......................... 528/380 |

* cited by examiner

*Primary Examiner* — Shane Fang
(74) *Attorney, Agent, or Firm* — Patent Central LLC; Stephan A. Pendorf

(57) ABSTRACT

A proton conducting copolymer electrolyte with competitive voltage versus current density characteristics and superior durability comprises a proton conducting hydrophilic domain comprising a sulfonated poly(phenylene) polymer, and a hydrophobic domain comprising a main chain comprising a plurality of bonded arylene groups wherein essentially all of the bonds in the main chain of the copolymer are carbon-carbon or, to a certain extent, carbon-sulfone bonds. More particularly, none of the bonds in the chains of the copolymer are ether bonds. Due to the absence of ether bonds, the copolymer electrolyte is less susceptible to degradation in solid polymer fuel cells.

10 Claims, 13 Drawing Sheets

Ar:

R1: $(CF_2)_lSO_3H$; $(CH_2)_lSO_3H$;

R2: $(CF_2)_lSO_3H$; $(CH_2)_lSO_3H$;

$l = 0 - 10$; $a = 1 - 5$; $b = 1 - 5$ $(m = 1 \sim 100)$

R3:

R2: $(CF_2)_lSO_3H$; $(CH_2)_lSO_3H$;

$l = 0 - 10$;

$x = 3$ or $4$; $y = 3$ or $4$ $(m = 1 \sim 100)$

R4 = H, (CF$_2$)$_k$CF$_3$; (CH$_2$)$_k$CH$_3$ k = 0 ~ 19; a = 1 ~ 5

Mixture of hydrophobic monomer
and hydrophilic monomer

↓ Catalyst Polymerization

Random copolymer

FIG. 5a

Hydrophobic monomer

↓ Catalyst Polymerization

Hydrophobic oligomer

+

Hydrophilic monomer

↓ Catalyst Polymerization

Sequenced copolymer

FIG. 5b

Hydrophilic monomer

↓ Catalyst Polymerization

Hydrophilic oligomer

+

Hydrophobic monomer

↓ Catalyst Polymerization

Sequenced copolymer

FIG. 5c

SULFONATED POLY(PHENYLENE) COPOLYMER ELECTROLYTE FOR FUEL CELLS

BACKGROUND

1. Field of the Invention

This invention relates to proton conducting polymer electrolytes used in solid polymer electrolyte fuel cells. In particular, it relates to sulfonated poly(phenylene) based copolymer electrolytes.

2. Description of the Related Art

Proton exchange membrane fuel cells (PEMFCs) convert reactants, namely fuel (such as hydrogen) and oxidant (such as oxygen or air), to generate electric power. PEMFCs generally employ a proton conducting polymer membrane electrolyte between two electrodes, namely a cathode and an anode. A structure comprising a proton conducting polymer membrane sandwiched between two electrodes is known as a membrane electrode assembly (MEA). MEA durability is one of the most important issues for the development of fuel cell systems in either stationary or transportation applications. For automotive applications for instance, an MEA may be required to demonstrate durability of about 6,000 hours.

The membrane electrolyte serves as a separator to prevent mixing of reactant gases as well as an electrolyte for transporting protons from anode to cathode. Perfluorosulfonic acid (PFSA) ionomer, e.g., Nafion®, has historically been the material of choice and the technology standard for both membranes and for ionomer employed in the catalyst layers of an MEA. Nafion® consists of a perfluorinated backbone that bears pendent vinyl ether side chains, terminating with $SO_3H$. Nafion® membranes show good operation under normal operating conditions but have several disadvantages. They are expensive, limited to operation at relatively low temperatures, and offer a poor permeance barrier to the hydrogen and oxygen reactants, which reduces the durability of a fuel cell stack and lowers fuel efficiency and the driving range of fuel cell vehicles. Further, Nafion® can release fluorine compounds upon decomposition, which can cause catalyst dissolution and raise environmental concerns. When used in a catalyst layer, the strong acidity of Nafion® can also accelerate degradation of the catalyst.

Accordingly, there is a desire to find an alternative ionomer for Nafion®. Several classes of hydrocarbon or semi-fluorinated polymers are under intense investigation. These include poly(ether arylenes), polyimides, polyphosphazenes, radiation-grafted polystyrene, organic-inorganic composites and hybrids, polystyrene di- and tri-block copolymers, and acid-complexes of basic polymers. However, most hydrocarbon membranes cannot meet the durability requirement of automotive fuel cells due to the presence of weak bonds in the ionomer chains. For instance, α-hydrogen of polystyrene is not stable under free radical attack, while ether bonds and polyimide structure are hydrolytically unstable (T. J. Peckham et al, Proton Exchange Membranes, in Proton Exchange Membrane Fuel Cells: Materials Properties and Performance, Editors: David P. Wilkinson et al, CRC Press, 2009, 107-189). Furthermore, most hydrocarbon membranes have insufficient performance under low RH (~30%) for automotive fuel cells. JSR Corporation and Honda Motor Co., Ltd developed an aromatic hydrocarbon PEM (K. Goto, et al Polymer Journal, 2009, 41(2): 95104; U.S. Pat. No. 7,449,132, US20100174042, U.S. Pat. No. 7,893,303). This aromatic polymer electrolyte comprised a hydrophilic block of sulfonated poly(benzophenone) and a hydrophobic block of poly(ether sulfone) or poly(ether ketone). In addition, the aromatic polymer electrolyte comprises ether bonds, either in the main chain of the hydrophobic block or in both side chains of the hydrophilic block and the main chain of the hydrophobic block.

Recently however, it was reported that hydrocarbon membranes with dense sulfonic acid groups exhibit higher performance than PFSA membrane at high temperature (S. Tian et al, Macromolecules, 2009, 42, 1153-1160; K. Matsumoto et al, Macromolecules, 2009, 42, 1161-1166). While these hydrocarbon membranes with dense sulfonic acid groups were synthesized by condensation polymerization of dichlorodiphenylsulfone or difluorobenzophenone with dihydroxy monomers followed by post-sulfonation, limited durability of these membranes in fuel cells can be expected due to the existence of ether bonds in the ionomer chains.

There remains a continuing need for improved hydrocarbon ionomer electrolytes for solid polymer electrolyte fuel cells and, in particular, for electrolytes exhibiting good performance and durability characteristics. This invention fulfills these needs and provides further related advantages.

SUMMARY

A sulfonated poly(phenylene) based proton conducting copolymer electrolyte has been developed that is characterized by competitive voltage versus current density and superior durability. The proton conducting copolymer electrolyte can have different microstructures (i.e. the arrangement of monomer units along the polymer chain) depending on the polymerization route (e.g. random copolymer, sequenced copolymer or block copolymer). The copolymer electrolyte comprises a sulfonated poly(phenylene) based hydrophilic domain and a hydrophobic domain comprising a main chain comprising a plurality of bonded arylene groups wherein essentially all of the bonds in the main chain of the copolymer are carbon-carbon bonds or, to a certain extent, carbon-sulfone bonds. And specifically, essentially none of the bonds in the chains of the copolymer are ether bonds. Without ether bonds, the copolymer electrolyte is less susceptible to degradation when used in solid polymer fuel cells.

The copolymer electrolyte of the invention may be used anywhere that electrolyte is normally employed in a fuel cell. However, it is particularly useful for use as the membrane in a membrane electrode assembly for a solid polymer electrolyte fuel cell.

These sulfonated hydrocarbon copolymer electrolytes can be synthesized using aryl-aryl coupling polymerization techniques. The chains formed can thus be essentially free of ether bonds, thereby producing an electrolyte with improved durability.

These and other aspects of the invention are evident upon reference to the attached Figures and following detailed description.

BRIEF DESCRIPTION OF THE DRAWINGS

FIGS. 5a, 5b, 5c, and 5d show several general pathways for making copolymer electrolytes of the invention.

FIGS. 6a and 6c also show plots for a comparative NRE211 electrolyte.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and are not limited to just one.

In a numerical context, the word "about" is to be construed as meaning plus or minus 10%.

The copolymer electrolytes of the present invention are sulfonated poly(phenylene) based hydrocarbon ionomers which can be synthesized by aryl-aryl coupling polymerization. These copolymers offer an advantage over prior art hydrocarbon ionomers in that when synthesized by aryl-aryl coupling polymerization, there are no weak ether bonds in the chains formed and thus exhibit good durability characteristics. Certain embodiments may be densely sulfonated (i.e. have at least one benzene ring substituted with three or four benzenesulfonic acid groups in one repeating unit of the hydrophilic structure of the hydrocarbon ionomer) in order to provide high proton conductivity even under low relative humidity conditions, thereby improving the fuel cell performance. Other embodiments may achieve adequate proton conductivity without dense sulfonation by optimizing the chemical structure of the hydrophilic domain and the hydrophobic domain as well as membrane morphology (microstructure, length of hydrophilic block and hydrophobic block, etc). Further still, embodiments of the invention may have less or essentially no fluoride ion release upon decomposition.

Figure 1A:
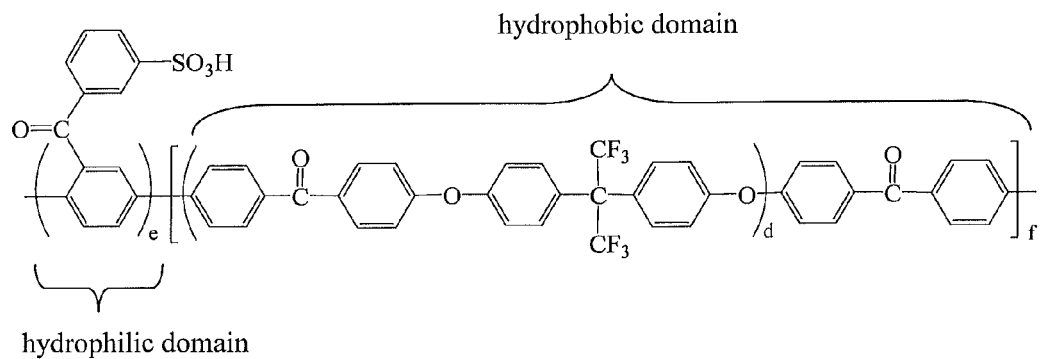
FIGS. 1a, 1b, and 1c show prior art sulfonated poly(phenylene) copolymer electrolytes comprising a sulfonated poly(phenylene) hydrophilic domain and a hydrophobic domain and all comprising an ether bond in the main chain.
Figure 1B:
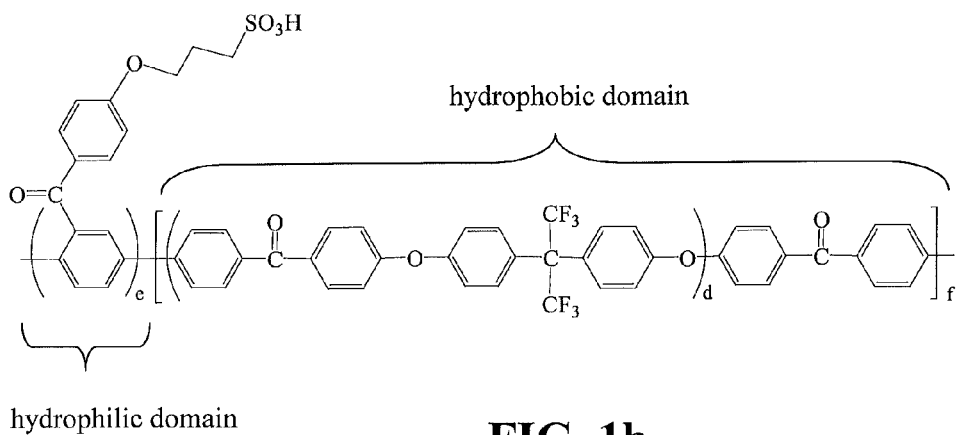
Figure 1C:
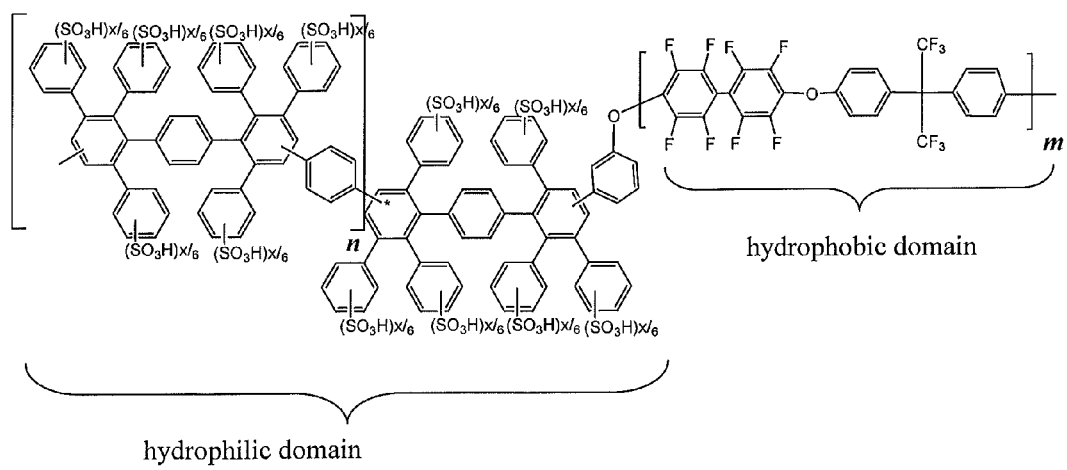

FIGS. 1a, 1b, and 1c show prior art sulfonated poly(phenylene) copolymer electrolytes comprising a sulfonated poly(phenylene) hydrophilic domain and a hydrophobic domain and all comprising an ether bond in the main chain. FIGS. 1a and 1b have been reproduced from US patent application 2010/0174042 and U.S. Pat. No. 7,893,303 respectively. FIG. 1c has been reproduced from U.S. patent application Ser. No. 12/425,413, filed Apr. 17, 2009 and titled "Multi-Block Sulfonated Poly(phenylene) Copolymer Proton Exchange Membranes", inventor C. Fujimoto, assignee Sandia National Labs. (In all these figures, the two domains in the copolymers have been identified as "hydrophilic domain" and "hydrophobic domain" respectively.) The hydrocarbon copolymers of these figures exhibit desirably competitive performance in fuel cells.

Figure 1D:
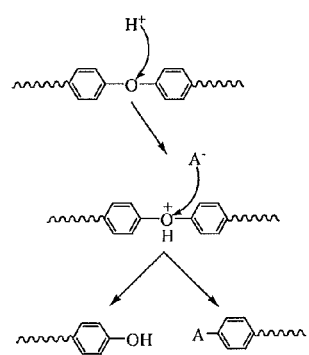
FIG. 1d shows a schematic of a cleavage reaction of an ether bond in polymers of the prior art.

FIG. 1d shows a schematic of a proposed cleavage reaction of an ether bond occurring in the sulfonation of polymers of the prior art. This cleavage reaction was disclosed in "Mastering Sulfonation of Aromatic Polysulfones: Crucial for Membranes for Fuel Cell Application", C. Iojoiu et al., Fuel Cells 2005, 5, No. 3 p 344. The article pertains to sulfonation of aromatic polysulfones in order to create ionomers intended for use in fuel cells and discusses chemical degradations which can occur. Without being bound by theory, it is believed that such mechanisms may be a factor in the limited durability of copolymers like that depicted in FIGS. 1a and 1b.

The present copolymers however essentially have only carbon-carbon or, to a certain extent, carbon-sulfone bonds in their main chains and have essentially no ether bonds in their chain network. While the majority of the bonds may be phenylene-phenylene, phenylene-carbon or carbon-carbon, the main chain may also contain sulfone groups in the alpha-position to phenylene/arylene groups. Those sulfone groups improve stability of the inventive copolymer electrolyte by stabilizing the neighboring benzene rings due to their strong electron withdrawing property. Moreover, those sulfone groups themselves exhibit good resistance against chemical attacks.

Figure 2A:
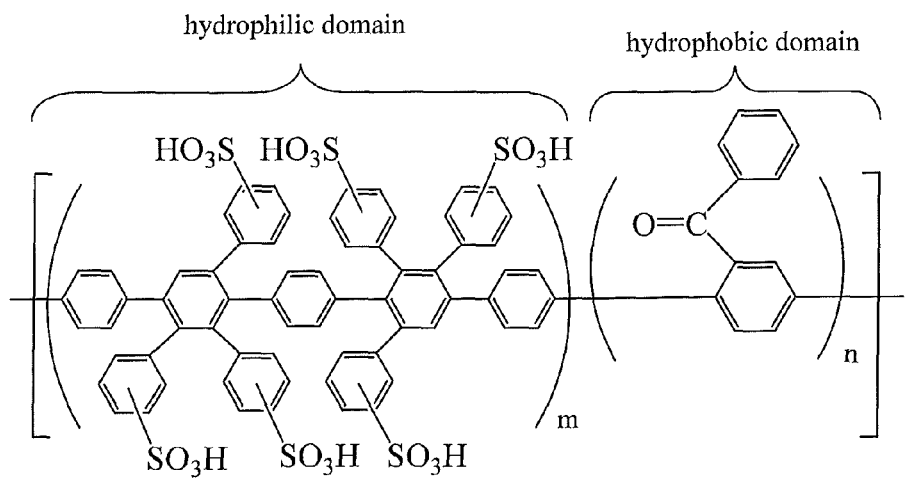
FIGS. 2a, 2b and 2c show the chemical structures of several copolymer electrolytes prepared in the Examples.
Figure 2B:
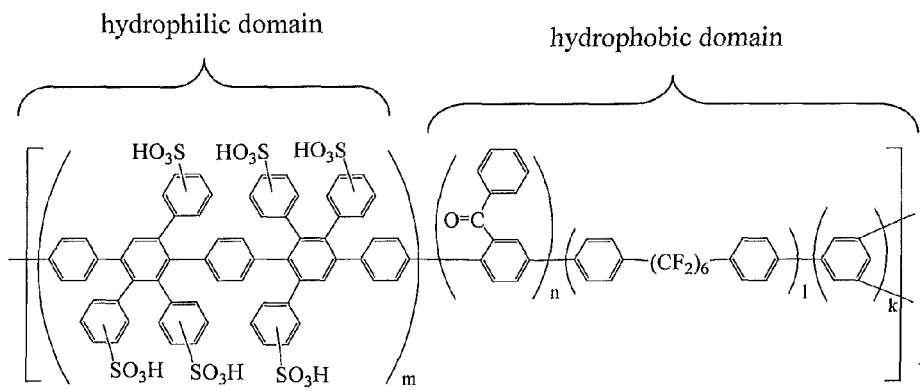
Figure 2C:
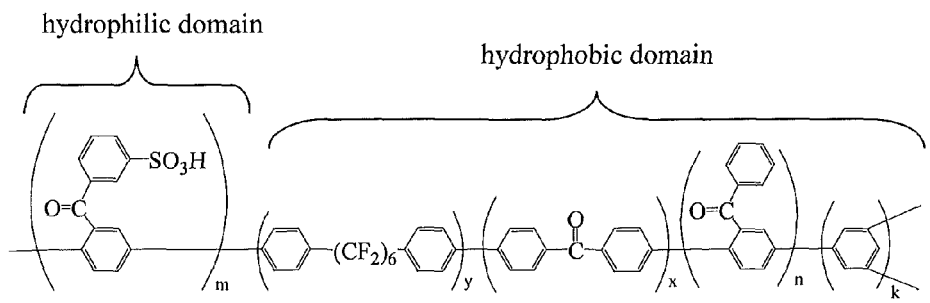

For instance, FIGS. 2a, 2b and 2c show the chemical structures of several copolymer electrolytes which were prepared in the Examples to follow. Again, the hydrophilic and the hydrophobic domains have been indicated in each figure. In the copolymers of FIGS. 2a and 2b, the hydrophilic domains are similar to that in FIG. 1c. However, the hydrophobic domains are different from that in FIG. 1c and comprise no ether linkages. In the copolymer of FIG. 2c, the hydrophilic domain is similar to those in FIGS. 1a and 1b (although not identical to FIG. 1b). However, the hydrophobic domain is different from those in FIGS. 1a and 1b comprise no ether linkages.

Figure 3A:
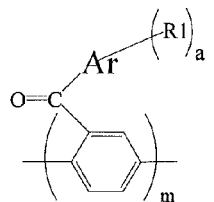
FIGS. 3a and 3b show the general structure of the hydrophilic domain in the copolymers of the invention.
Figure 3A:
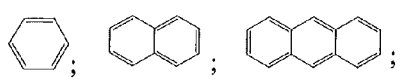
Figure 3B:
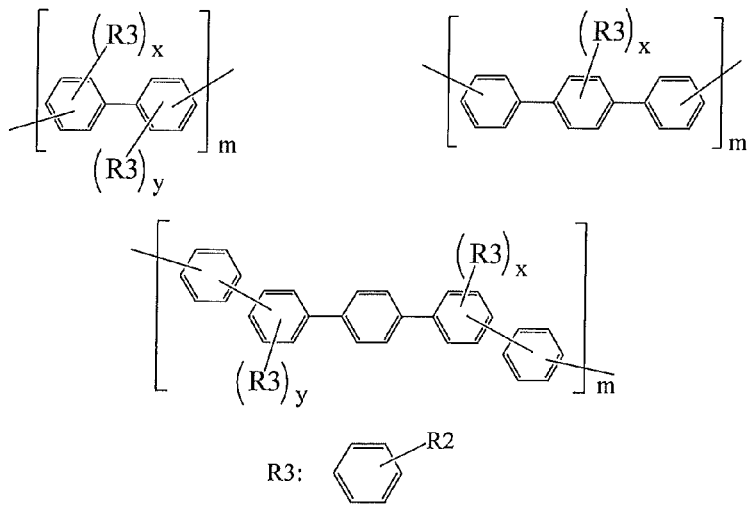

The chemical structures of polymers which may be potentially suitable for use as the hydrophilic domain in the copolymers of the invention are shown in FIGS. 3a and 3b. The structures in FIG. 3a are chemically similar to the hydrophilic domain in the copolymer of FIG. 2c which has been actually tested in the Examples below. The structures in FIG. 3b are chemically similar to the hydrophilic domain in the copolymer of FIG. 2b which has been actually tested in the Examples below.

The general hydrophilic structure in FIG. 3a comprises an Ar group and a number (a) of R1 sulfonated groups. Ar can be an aromatic structure containing from 1 to 4 benzene rings as shown. R1 can be one of various sulfonated groups including an aryl group which itself comprises another sulfonated group R2 and in which R2 can be a sulfonated group as shown. In FIG. 3a, subscript l can range from 0 to 10, subscript a from 1 to 5, and subscript b from 1 to 5.

In a like manner, the general hydrophilic structure in FIG. 3b comprises one of three different monomer units comprising a number (x and/or y) of R3 sulfonated groups as shown. R3 is an aryl group which comprises a sulfonated group R2 as above. In FIG. 3b, subscript l can range from 0 to 10, and both subscripts x and y can be either 3 or 4.

Figure 4A:
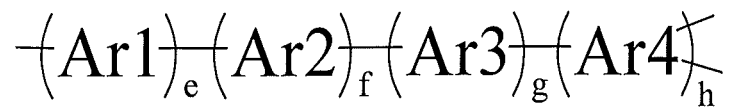
FIG. 4a shows the general structure of the hydrophobic domain in the copolymers of the invention.

The hydrophobic structures of polymers which are potentially suitable for use as the hydrophobic domain in the copolymers of the invention are shown in FIG. 4a. The structures in FIG. 4a are chemically similar to the hydrophobic domains in the copolymers of FIGS. 2a to 2c which have been actually tested in the Examples below. FIGS. 4b, 4c, 4d, and 4e show the general chemical structure of each subunit in the structure of FIG. 4a respectively. A preferred embodiment of the invention may comprise certain amounts of each these subunits as explained further below.

Figure 4B:
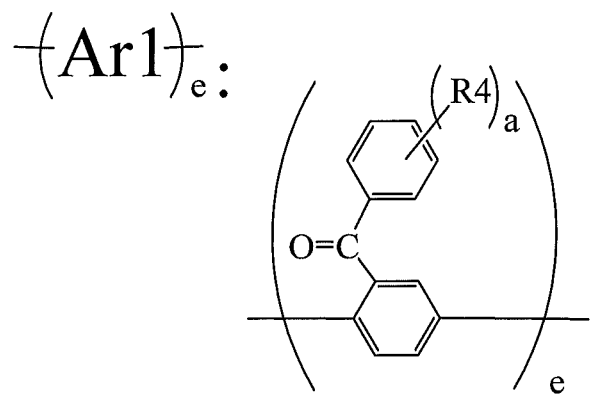
FIGS. 4b, 4c, 4d, and 4e show the general chemical structure of the subunits in the structure of FIG. 4a respectively.

The general hydrophobic structure in FIG. 4a can comprise four different subgroups Ar1, Ar2, Ar3, and Ar4 in random or block order and in amounts e, f, g, and h respectively. FIG. 4b shows the general structure of the Ar1 subunit. Ar1 is a di-halogenated benzophenone monomer with a high reactivity for a coupling reaction. This subunit comprises a number (a) of groups R4 as shown. In FIG. 4b, subscript k can be from about 0 to 19 and subscript a from 1 to 5.

Figure 4C:
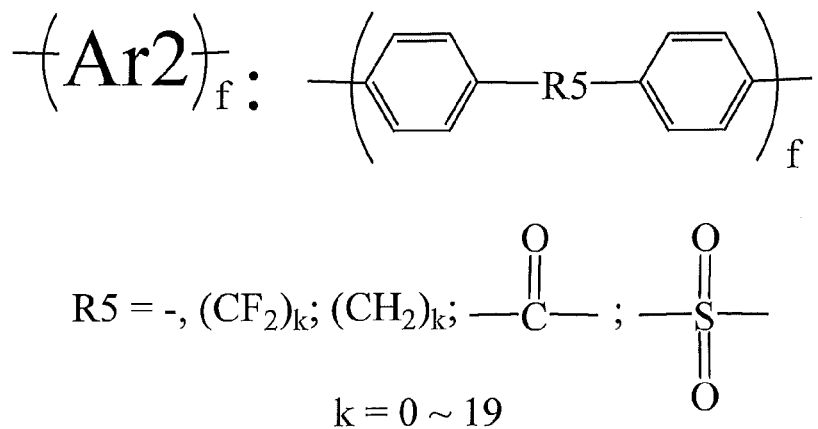

FIG. 4c shows the general structure of the Ar2 subunit. Ar2 is a monomer which can be used to modify the mechanical properties of the copolymer, such as tensile strength, tearing strength, and elongation. Generally Ar2 contains a flexible (perfluoro) aliphatic unit or an electronic withdrawing group (ketone or sulfone). This subunit comprises a group R5 as shown and again subscript k can be from about 0 to 19.

Figure 4D:
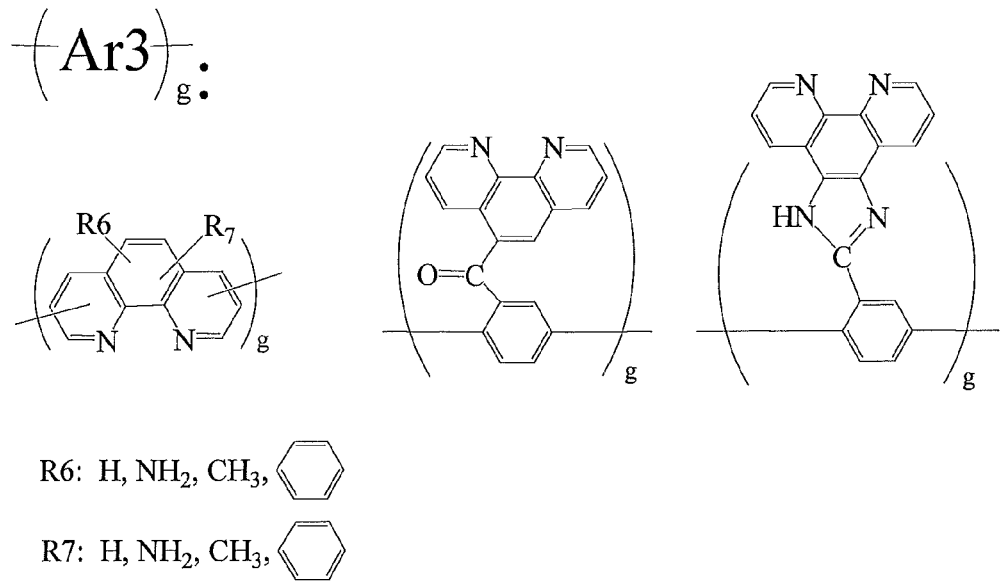

FIG. 4d shows the general structure of the Ar3 subunit. Ar3 is a monomer bearing metal chelating group. The metal chelating group is 1,10-phenanthroline or its derivatives. The metal chelating group can be either on the main chain or the side chain of the polymer. In a fuel cell, the metal chelating group can form a complex with metal ion impurities, reduce free radical production during operation, and thereby improve durability. An option for this subunit comprises groups R6 and R7 as shown.

Figure 4E:
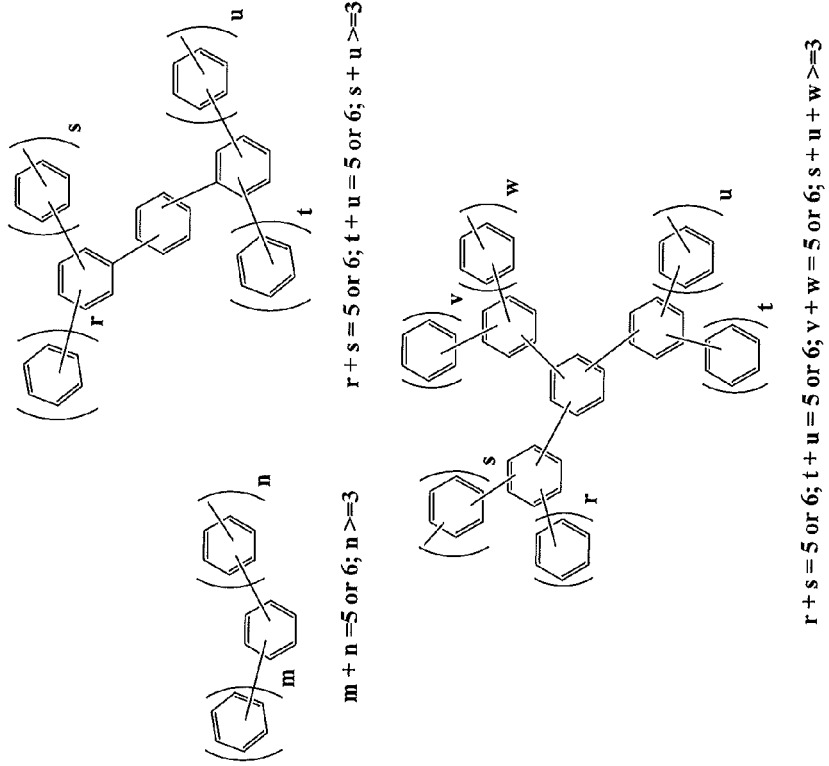

Finally, FIG. 4e shows the general structure of the Ar4 subunit. Ar4 is a monomer bearing multi-functional groups (≥3) for coupling polymerization. The Ar4 monomer may be used in the polymer to form a branch structure (lightly crosslinking) to improve mechanical properties and dimensional stability of the copolymer membrane. Numerous options exist for this subunit as shown. Some options comprise one or more of groups R8, R9, and R10 as shown in which subscript l can be from about 0 to 10. In other options, a number of configurations of linked aryl groups can be involved. As shown in FIG. 4e, the conditions on the subscripts are m+n is 5 or 6; n is greater than or equal to 3; r+s is 5 or 6; t+u is 5 or 6; and v+w is 5 or 6. Further, in the relevant option not involving subscript w, s+u is greater than or equal to 3. In the relevant option involving subscript w, s+u+w is greater than or equal to 3.

Copolymers of the invention therefore comprise both a hydrophilic domain and a hydrophobic domain, in which the hydrophilic domain provides proton conductivity, and the hydrophobic domain provides desirable mechanical properties and improves membrane durability.

Figure 5D:
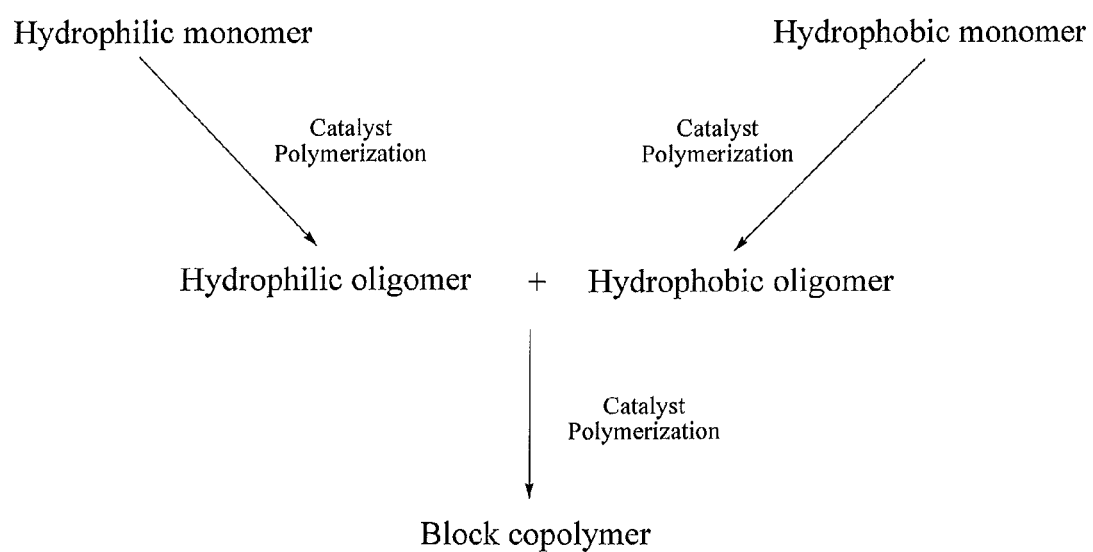

Various approaches may be employed in synthesizing the copolymer electrolytes of the invention. FIGS. 5a, 5b, 5c, and 5d show the general pathways involved in some of these approaches. For instance, FIG. 5a generally illustrates how the copolymer electrolyte can be made as a random copolymer. FIGS. 5b and 5c generally illustrate two alternative approaches for how the copolymer electrolyte can be made as a sequenced copolymer. And FIG. 5d generally illustrates how the copolymer electrolyte can be made as a block copolymer. Those skilled in the art will be aware of many detailed options available for preparing copolymers according to any of these schemes.

Without being bound by theory, it is believed that the copolymers of the invention exhibit improved durability when used in fuel cells because of the absence of weak ether bonds in the chains of the copolymer. Further improvements may also arise from the existence of metal chelating groups in the copolymer. Competitive performance characteristics may be obtained by adequately sulfonating the hydrophilic blocks in the copolymer (e.g. densely sulfonating them) for proton conduction purposes. A desired tensile strength, tearing strength and elongation of the electrolyte may be obtained by optimizing the chemical structure and composition of Ar1, Ar2 and Ar4 monomers in hydrophobic domain. For example, flexibility of the copolymer can be improved by introducing sufficient —$CF_2$— segments into the polymer chains and mechanical strength can be improved by optimizing the crosslinking degree via incorporation of suitable aryl segments with additional bonds (i.e. —Ar— in FIGS. 4a and 4e).

The chemical stability of the copolymer electrolyte can be improved by incorporation of metal chelating groups Ar3 in the copolymer.

The following examples are illustrative of the invention but should not be construed as limiting in any way.

EXAMPLES

1) Synthesis of the Unsulfonated Hydrophilic Monomer for the Copolymers of FIG. 2a and FIG. 2b 3,3'-(1,4-phenylene)bis[2,4,5-triphenylcyclopentadienone] was synthesized as described elsewhere (M. A. Olgliaruso, E. I. Becker, J. Org. Chem., 1965, 30, 3354~3360). Then, to synthesize the unsulfonated monomer for this hydrophilic domain, a 100 ml Schlenk flask was loaded with 3,3'-(1,4-phenylene)bis[2,4,5-triphenylcyclopentadienone] (10 g), 4-chlorophenylacetylene (6 g), and diphenyl ether (30 ml). The resulting mixture was freeze-thaw degassed three times, before heating under nitrogen (1 atm) at 180° C. for 30 minutes. Periodically, carbon monoxide was vented to avoid over-pressurization of the reaction flask. Subsequently, an additional 0.3 g of 4-chlorophenylacetylene was added, and the mixture was stirred for an additional 90 minutes at 180° C. under nitrogen atmosphere. The reaction flask was then cooled to room temperature, and 30 ml of toluene was added. The monomer was precipitated by dropwise addition of the obtained solution to 400 ml of methanol. The resultant white powder was re-dissolved into 80 ml of toluene, precipitated into 400 ml of methanol again, and washed thoroughly by methanol, before drying under vacuum at 80° C. overnight. The yield for this step was ~90%. The chemical structure of the monomer was confirmed by $^1$H-NMR, $^{13}$C-NMR and MALDI-TOF MS.

2) Synthesis of the Hydrophobic Monomer for the Copolymers of FIG. 2b and FIG. 2c 1,6-di(4-chlorophenyl)perfluorohexane monomer was synthesized as described in reference V. C. R. McLoughlin and J. Thrower, Tetrahedron, 1969, 25, 5921~5940.

3) Synthesis of Unsulfonated Copolymer for the Copolymer of FIG. 2a

To a 100 ml Schlenk flask equipped with rubber septa cap were added bis-triphenylphosphine nickel dichloride (0.15 g), triphenylphosphine (1.5 g), activated zinc powder (1.5 g), and sodium iodide (0.08 g). All the chemicals were pre-dried under vacuum at 70° C. for 4 h. Then anhydrous N-Methyl-2-pyrrolidone (NMP, 5 ml) was added via syringe. The catalyst mixture was stirred at ambient temperature for 10 minutes. While maintaining the flask under argon atmosphere, monomers were loaded into a 25 ml round-bottom flask equipped with rubber septa cap in the following amounts: 1.0 g (3.984 mmol) of 2,5-dichlorobenzophenone, 0.60 g of the hydrophilic domain from synthesis 1) above (0.664 mmol, molar ratio of 2,5-dichlorobenzophenone and hydrophilic domain is 6:1). To the monomers, 12 ml of anhydrous NMP was added via syringe and the resulting monomer solution was added into the Schlenk flask via syringe. The polymerization proceeded at 80° C. for 24 h under argon atmosphere. The polymerization mixture was then cooled to room temperature and poured into 20% HCl/methanol solution (500 ml), and stirred for 30 minutes. The resultant white solid was further washed by methanol (200 ml) and acetone (300 ml), before drying in a vacuum oven at 80° C. for 4 h. The typical yield of the polymerizations was 98%. The molecular weight determined by GPC with polystyrene standard is Mn=14,280 Dalton, Polydispersity index PDI=2.26.

4) Synthesis of Unsulfonated Copolymer for the Copolymer of FIG. 2b

To a 100 ml Schlenk flask equipped with rubber septa cap were added bis-triphenylphosphine nickel dichloride (0.15 g), triphenylphosphine (1.5 g), activated zinc powder (1.5 g), and sodium iodide (0.08 g). All the chemicals were pre-dried under vacuum at 70° C. for 4 h. Then anhydrous N-Methyl-2-pyrrolidone (NMP, 5 ml) was added via syringe. The catalyst mixture was stirred at ambient temperature for 10 minutes. While maintaining the flask under argon atmosphere, monomers were loaded into a 25 ml round-bottom flask equipped with rubber septa cap in the following amounts: 1.0 g (3.984 mmol) of 2,5-dichlorobenzophenone, 0.75 g of the hydrophilic domain of synthesis 1) above (0.828 mmol), and 0.36 g of the hydrophobic domain of synthesis 2) above (0.688 mmol) and 0.0346 g 1,3,5-tribromobenzene (0.11 mmol, 2% (mol ratio) of the total molar of hydrophilic domain, 2,5-dichlorobenzophenone and hydrophobic domain monomers). To the monomers, 12 ml of anhydrous NMP was added via syringe and the resulting monomer solution was added into the Schlenk flask via syringe. The polymerization proceeded at 80° C. for 24 h under argon atmosphere. The polymerization mixture was then cooled to room temperature and poured into 20% HCl/methanol solution (500 ml), and stirred for 30 minutes. The resultant white solid was further washed by methanol (200 ml) and acetone (300 ml), before drying in a vacuum oven at 80° C. for 4 h. The typical yield of the polymerizations was 95%. The molecular weight determined by GPC with polystyrene standard is Mn=18,090 Dalton, PDI=2.04.

5) Synthesis of the Copolymers of FIGS. 2a and 2b

The unsulfonated polymers above were then sulfonated to prepare the final sulfonated copolymers of FIGS. 2a and 2b. The method employed for sulfonation for both of the preceding unsulfonated copolymers was as follows. 1.00 g polymer was dissolved in 10 mL halogen solvent (for example chloroform, dichloroethane, or dichloromethane) in a three neck flask under nitrogen. Then 30 mL sulfuric acid was charged to the solution, the reaction was carried out at 50° C. for 16 hours. After cooled down to room temperature, the solution was poured into 250 mL DI water. The precipitated solid was then filtered, and dried under vacuum. A sample of the copolymer shown in FIG. 2a was thus prepared in this manner.

In addition, a sample of the copolymer of FIG. 2b was also prepared. With reference to FIG. 2b, this sample was determined to have the following characteristics: Ion exchange capacity IEC=3.3 mmol/g, n:m:l≈5:1:1, k=0.02 (molar percentage)

6) Synthesis of Copolymer of FIG. 2c

Sulfonated monomer sodium 3-(2,5-dichlorobenzoyl)benzenesulfonate was synthesized as described in reference Z. Qiu, S. Wu, Z. Li, S. Zhang, W Xing and C. Liu, Macromolecules 2006, 39, 6425-6432.

The copolymer of FIG. 2c was then synthesized as follows. To a 100 ml Schlenk flask equipped with rubber septa cap were added bis-triphenylphosphine nickel dichloride (0.15 g), triphenylphosphine (1.5 g), activated zinc powder (1.5 g), and sodium iodide (0.08 g). All the chemicals were pre-dried under vacuum at 70° C. for 4 h. Then anhydrous N-Methyl-2-pyrrolidone (NMP, 5 ml) was added via syringe. The catalyst mixture was stirred at ambient temperature for 10 minutes. While maintaining the flask under argon atmosphere, monomers were loaded into a 25 ml round-bottom flask equipped with rubber septa cap in the following amounts: 1.3436 g (3.805 mmol) of sodium 3-(2,5-dichlorobenzoyl)benzenesulfonate, 0.0604 g (0.2405 mmol) 4,4'-dichlorobenzophenone, 0.1258 g of the hydrophobic domain of synthesis 2) above (0.2405 mmol), 0.3018 g (1.202 mmol) 2,5-dichlorobenzo-phenone, and 0.0345 g (0.11 mmol) 1,3,5-tribromobenzene (2% (mol ratio) of the total molar of sodium 3-(2,5-dichlorobenzoyl)benzenesulfonate, 2,5-dichlorobenzophenone, 4,4'-dichlorobenzophenone and hydrophobic domain monomers). To the monomers, 15 ml of anhydrous NMP was added via syringe and the resulting monomer solution was added into the Schlenk flask via syringe. The polymerization proceeded at 80° C. for 48 h under argon atmosphere. The polymerization mixture was then cooled to room temperature and poured into 20% HCl/methanol solution (500 ml), and stirred for 30 minutes. The resultant white solid was further washed by methanol (200 ml) and acetone (300 ml), before drying in a vacuum oven at 50° C. overnight. The typical yield of the polymerizations was 90%.

A sample of the copolymer of FIG. 2c was thus prepared. With reference to FIG. 2c, this sample was determined to have the following characteristics: actual IEC=2.61 mmol/g (note: the theoretical IEC is 2.78 mmol/g), n:x:y=5:1:1, k=0.02 (molar percentage).

7) Membrane Preparation and Fuel Cell Testing

Membrane electrolytes for use in experimental fuel cells were prepared using samples of the copolymers of FIG. 2b and FIG. 2c and are herein denoted as samples HC1 and HC2 respectively. The HC1 membrane was cast from 10% (wt) DMAc solution; while the HC2 membrane was cast from 10% (wt) in the mixture of 1-propanol and water (1-propanol:water=95:5 (vol)) solvent. IEC of HC1 and HC2 by titration were 3.30 mmol/g and 2.61 mmol/g, respectively. The thicknesses of the HC1 and HC2 membranes were 26 and 18 micrometers respectively. Commercial membrane electrolyte was also obtained from Dupont for comparison purposes. The commercial membrane was NRE211, a perfluorosulfonic acid ionomer with a thickness of 25 micrometers.

Individual MEAs were made by bonding the appropriate membrane electrolyte sample between cathode and anode electrodes. The cathode and anode had Pt loadings of 0.7 mg/cm$^2$ and 0.3 mg/cm$^2$ respectively. The MEAs were bonded into unitary assemblies at 160° C. or 150° C. (for the inventive and comparative samples respectively) under pressure for 2.5 minutes.

Fuel cells with 48 cm$^2$ active area were then assembled using each of the above MEA samples. Air and hydrogen were used as reactant gases. Four different operating conditions were used in this testing to simulate various conditions which may be encountered during an automotive duty cycle. The conditions were denoted as Normal, Dry, Hot, and Warmup. In all cases, air and hydrogen were used at gas stoichiometries of 10.2. In Normal operation, the air and hydrogen was supplied at 71% and 97% RH at the highest current employed and decreased to 52% and 79% RH at the lowest current employed respectively. The operating temperature of the stack was 68° C. In Dry operation, the air and hydrogen were supplied at 50% and 110% RH at the highest current and increased/decreased to 52% and 79% RH at the lowest current respectively. The operating temperature of the stack was 68° C. In Hot operation, the air and hydrogen were supplied at 49% and 91% RH at the highest current and decreased to 42% and 54% RH at the lowest current respectively. The operating temperature of the stack was 85° C. In Warmup operation, the air and hydrogen were supplied at 50% and 139% RH at the highest current and increased/decreased to 73% and 104% RH at the lowest current respectively. The operating temperature of the stack was 40° C.

Figure 6A:
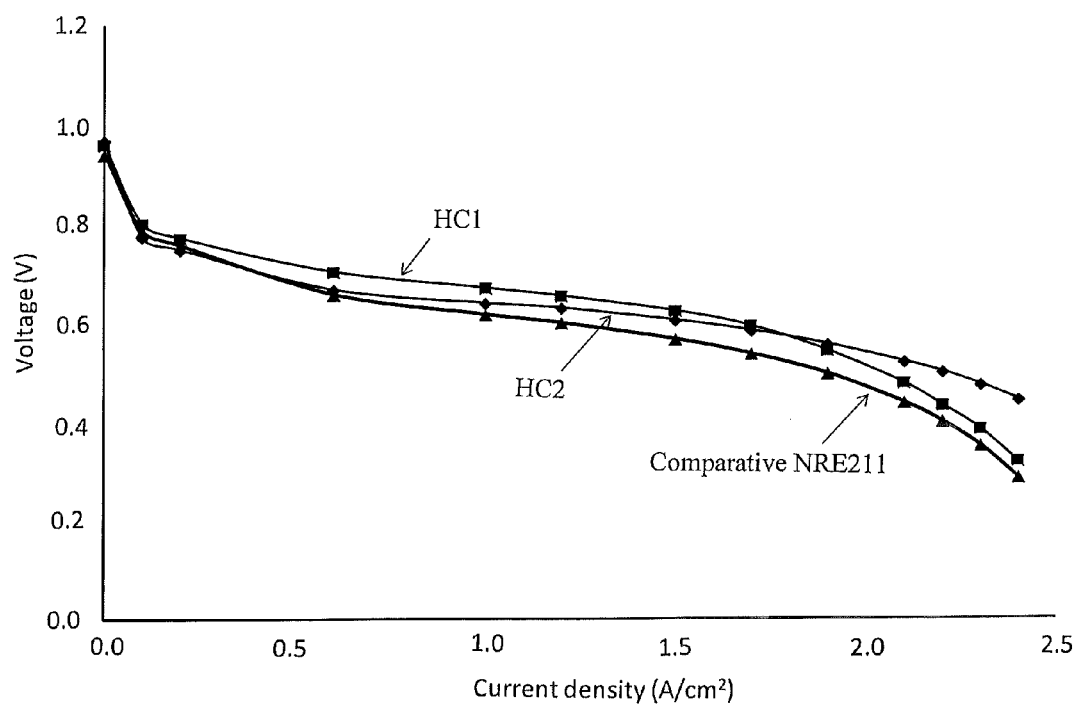
FIGS. 6a, 6b, 6c, and 6d show voltage versus current density polarization plots for fuel cells in the Examples comprising two different copolymers of the invention while operating under normal, dry, hot, and warmup automotive conditions respectively.
Figure 6B:
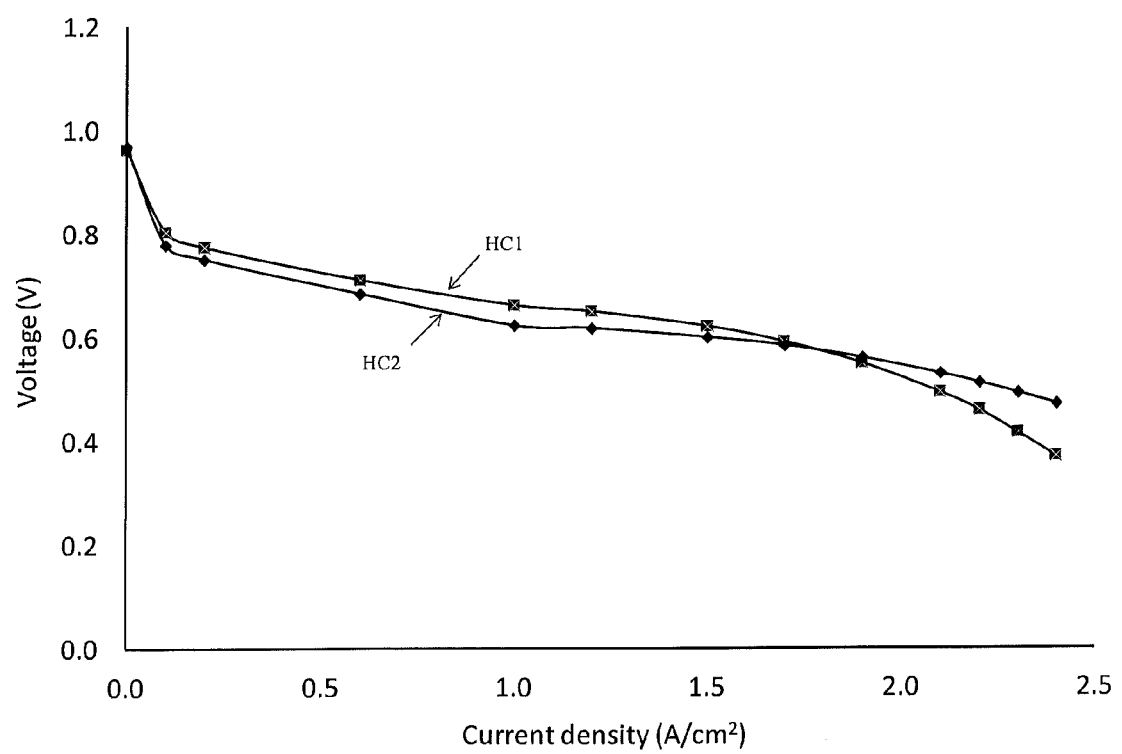
Figure 6C:
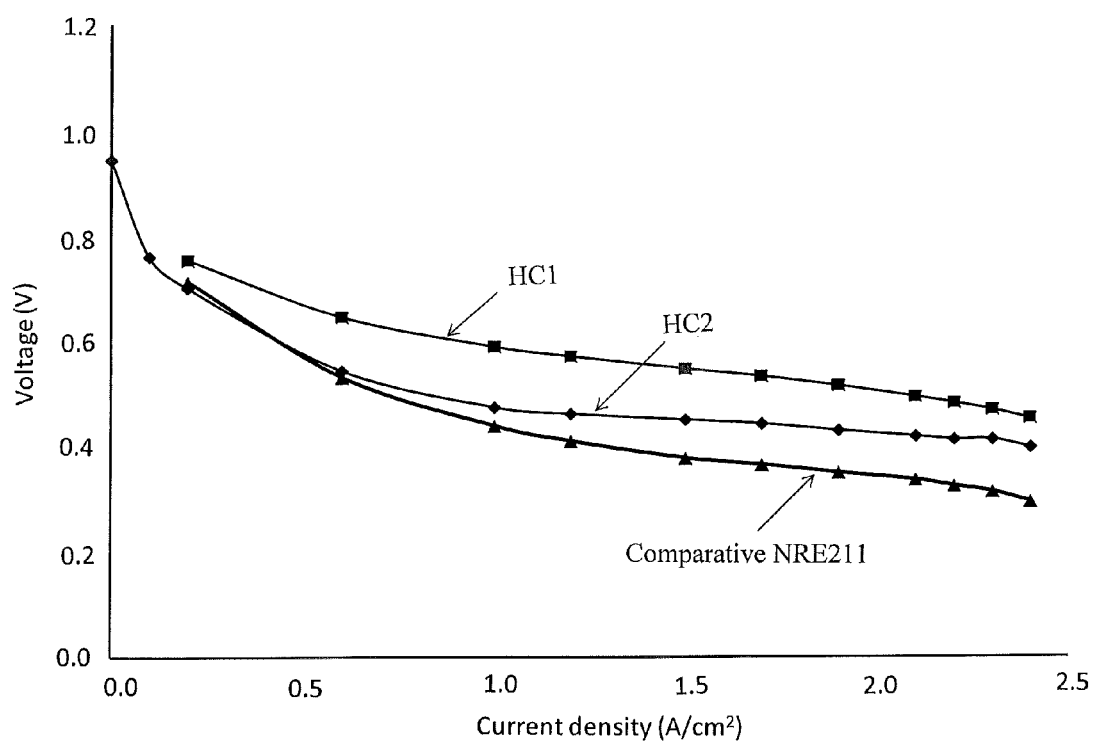
Figure 6D:
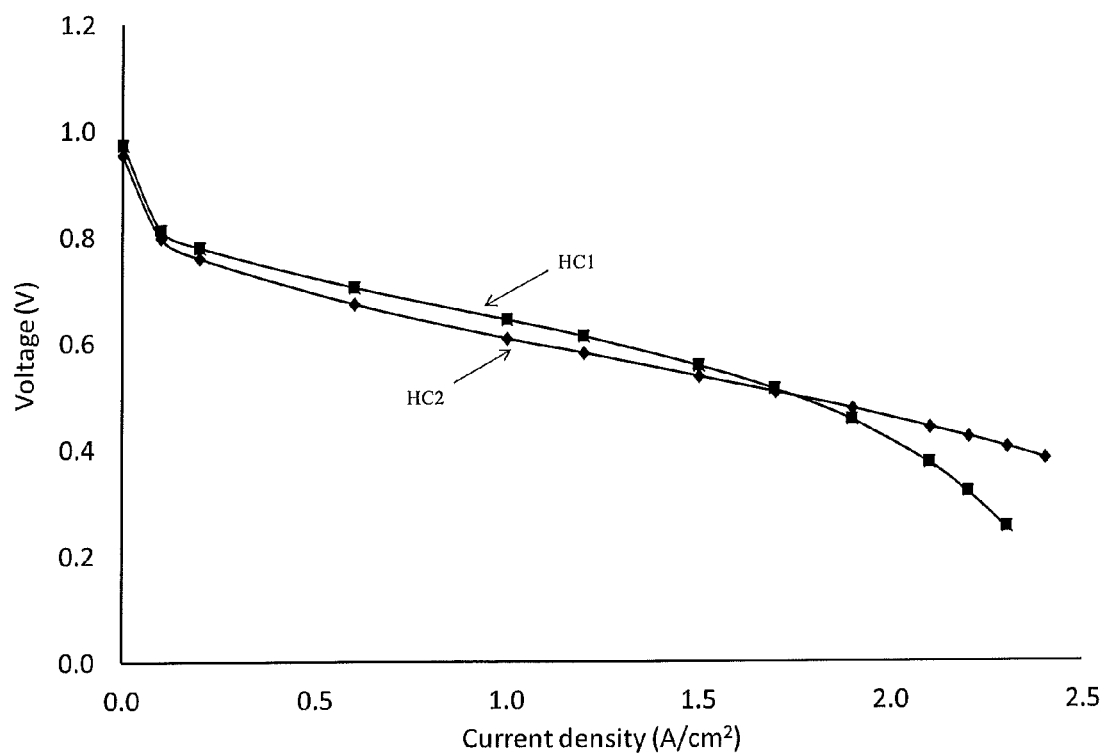

FIGS. 6a, 6b, 6c and 6d show the voltage versus current density (polarization) curves obtained for the cells comprising samples HC1 and HC2 under Normal, Dry, Hot, and Warmup conditions respectively. Data for the comparative NRE211 electrolyte was also available under Normal and Hot conditions and is shown in FIGS. 6a and 6c for comparison. As is evident from these results, the performance of both inventive copolymers is competitive under all operating conditions, and superior to the comparative NRE211 sample under the conditions tested.

Note that based on results from the literature, a benefit of densely sulfonated hydrocarbon membranes (e.g. like the HC1 copolymer) is performance at low RH conditions. An advantage that copolymers like sample HC2 have over copolymers like sample HC1 however is that it may be easier to synthesize the former in high molecular weights and thus it may enjoy improved mechanical properties. In turn, durability may be significantly affected by these mechanical properties The amount of hydrogen crossing over the membrane electrolyte from the anode to the cathode side of the fuel cell was determined for both the HC1 and HC2 samples and was compared to that of a conventional Nafion® NRE211 perfluorosulfonic acid membrane. Hydrogen crossing over from the anode to the cathode can be quickly oxidized on the cathode catalyst surface under an applied potential, which results in a current flow. For an electrically well insulated MEA, the current first increases with the potential and soon reaches a maximum current plateau. The oxidation current plateau in the voltammogram gives an indication of the amount of hydrogen crossover. The higher the oxidation current plateau, the higher the hydrogen crossover. In each case, linear sweep voltammetry (LSV) was carried out with a scan rate of 2 mV/sec from 0.1 to 0.6 V, and the maximum current was measured when the I-V curve showed a current plateau. The stack test conditions were 90° C., 95% RH, pressure: 2.6 bara (anode) and 2.5 bara (cathode), and the gas flow rates for each reactant were 3 slpm per cell. The hydrogen crossover currents of the HC1 and HC2 electrolytes were 4.8 mA/cm$^2$ and 3.5 mA/cm$^2$ respectively. The hydrogen crossover current of the conventional NRE211 electrolyte was 5.6 mA/cm$^2$. Even though the HC2 electrolyte (18 μm) was much thinner than the conventional NRE211 electrolyte (25 μm), the hydrogen crossover current of the former was still much lower than that of the latter. These measurements demonstrate that the hydrocarbon copolymer electrolytes of the invention show lower permeability to hydrogen than conventional PFSA membrane.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, while copolymers were prepared in the Examples by employing polymerization steps first and then following these with sulfonation, the copolymers can also be synthesized by direct polymerization of sulfonated monomers or oligomers with hydrophobic monomers or oligomers. Therefore, such modifications are to be considered within the purview and scope of the claims appended hereto.

What is claimed is:

1. A proton conducting copolymer electrolyte comprising:
   a proton conducting sulfonated poly(phenylene) hydrophilic domain; and
   a hydrophobic domain comprising a main chain comprising a plurality of bonded arylene groups;
   wherein essentially all of the bonds in the main chain of the copolymer electrolyte are carbon-carbon or carbon-sulfone bonds, and
   wherein the structure of the hydrophilic domain is selected from the group consisting of:

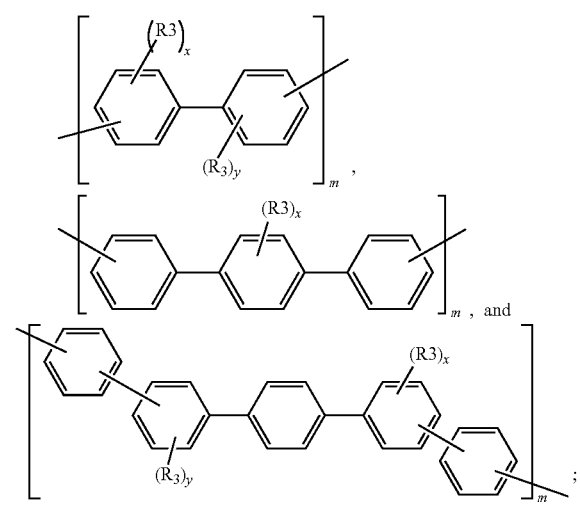

wherein R3 is:

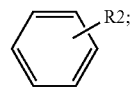

R2 is:

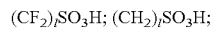

l is an integer in the range from 0 to 10;

x is 3 or 4;

y is 3 or 4; and m is an integer in the range from about 1 to 100.

2. The copolymer electrolyte of claim 1 wherein essentially all of the bonds in the main chain of the copolymer electrolyte are carbon-carbon bonds.

3. The copolymer electrolyte of claim 1 wherein essentially none of the bonds in the chains of the copolymer electrolyte are ether bonds.

4. The copolymer electrolyte of claim 1 wherein the structure of the hydrophobic domain is:

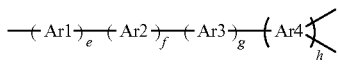

wherein e, f, g, and h are integers greater than or equal to zero, and at least one is greater than zero;
wherein —(Ar1)$_e$- is:

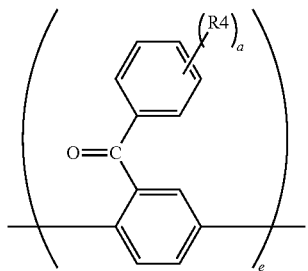

$R_4$ is H, $(CF_2)_kCF_3$, or $(CH_2)_kCH_3$,
k is an integer in the range from about 0 to 19, and
a is an integer in the range from about 1 to 5;
wherein —(Ar2)$_f$- is:

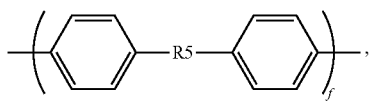

R5=—; $(CF_2)_k$; $(CH_2)_k$;

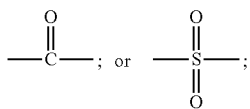

and
k is in the range from about 0 to 19;
wherein —(Ar3)$_g$- is:

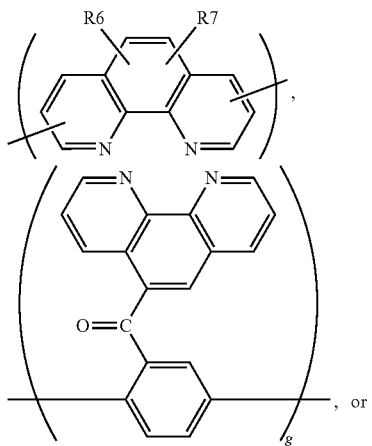

, or

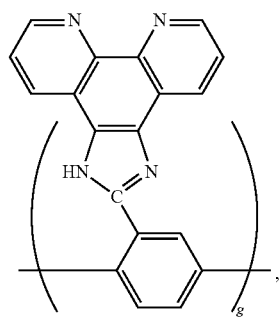

R6 is H, $NH_2$, $CH_3$, or phenyl; and
R7 is H, $NH_2$, $CH_3$, or phenyl; and
wherein —(Ar4)$_h$- is:

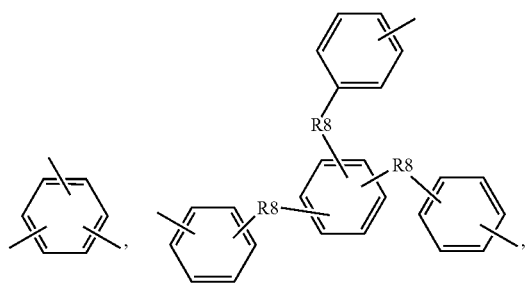

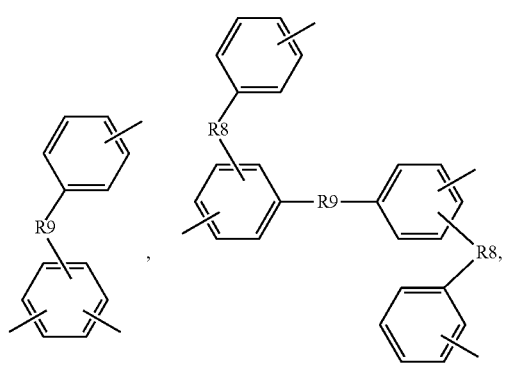

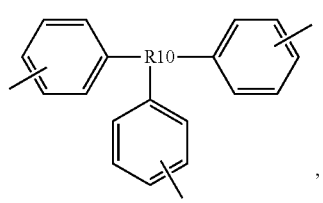

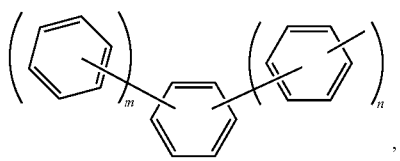

-continued

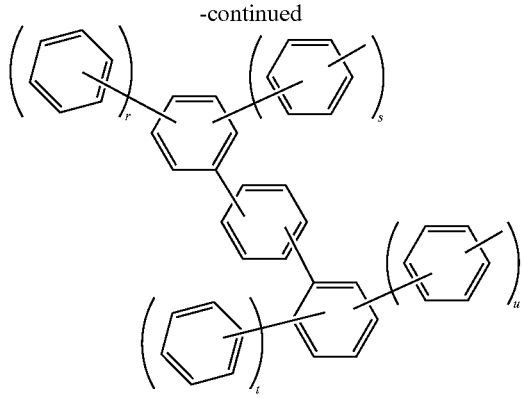

wherein r, s, t and u are positive integers and r+s=5 or 6, t+u=5 or 6, and s+u>=3 or

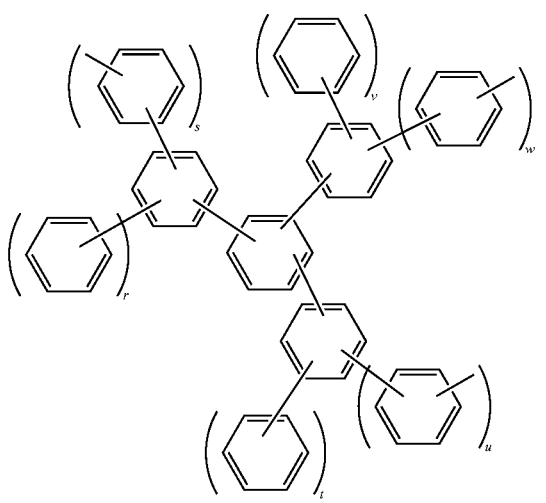

wherein r, s, t, u, v and w are positive integers and r+s=5 or 6, t+u=5 or 6, v+w=5 or 6, and s+u+w>=3;

R8 is:

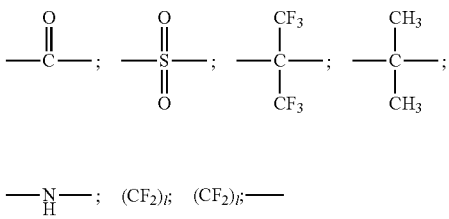

R9 is:

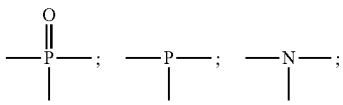

R10 is:

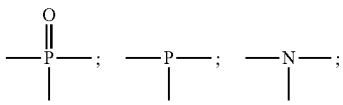

l is an integer in the range from about 0 to 10; and
m and n are integers greater than or equal to zero and m+n=5 or 6, and n>=3.

5. The copolymer electrolyte of claim 1 wherein the structure of the hydrophilic domain is selected from the group consisting of:

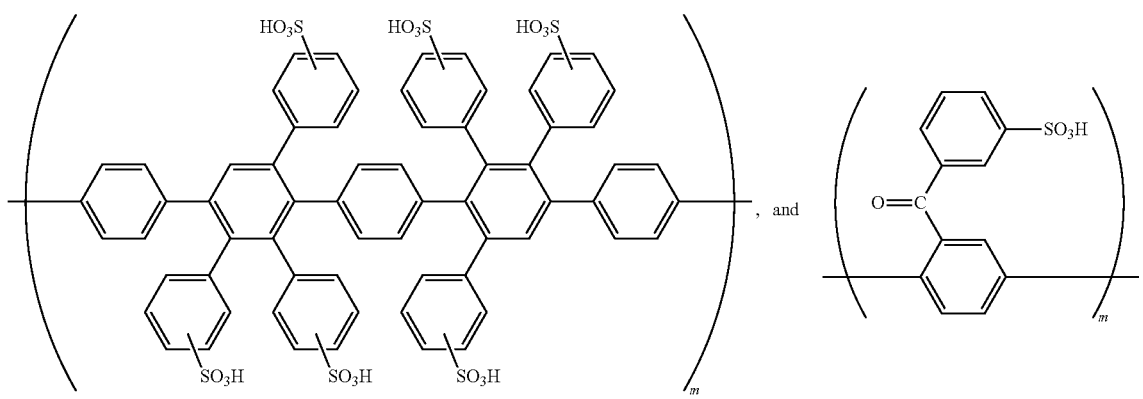

6. The copolymer electrolyte of claim 4 wherein the structure of the hydrophobic domain is selected from the group consisting of:

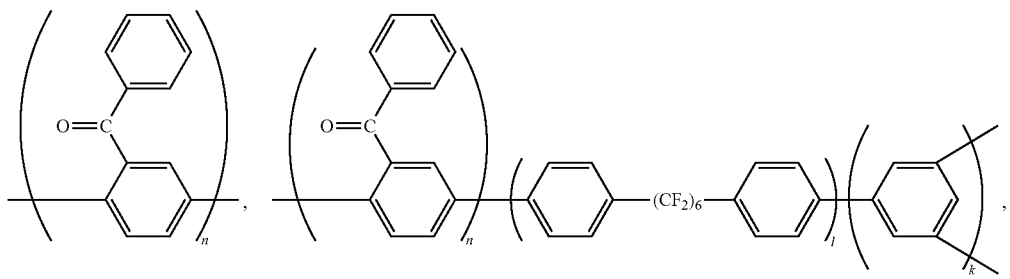

wherein
n=3-6;
l is an integer in the range from about 0 to 10;
k is an integer in the range from about 0 to 19, and

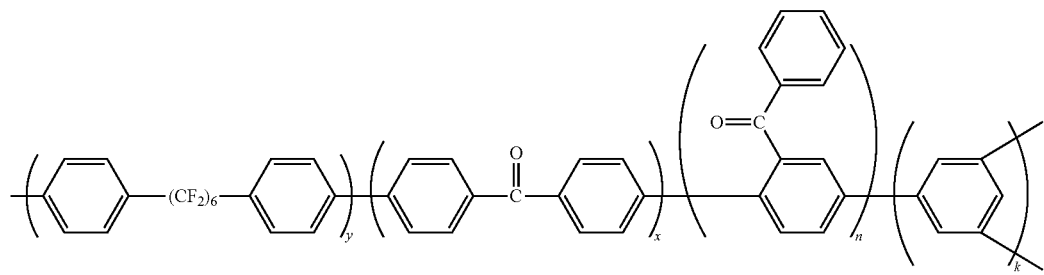

wherein n=3-6;

k is an integer in the range from about 0 to 19; and n:x:y=5:1:1.

7. The copolymer electrolyte of claim 1 wherein the structure of the hydrophilic domain is:

and the structure of the hydrophobic domain is:

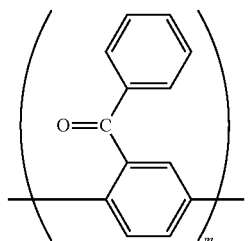

8. The copolymer electrolyte of claim 1 wherein the structure of the hydrophilic domain is:

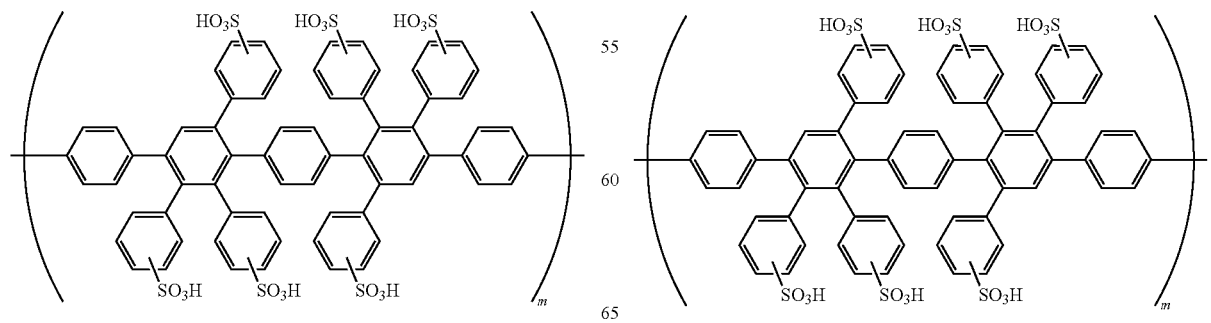

and the structure of the hydrophobic domain is:
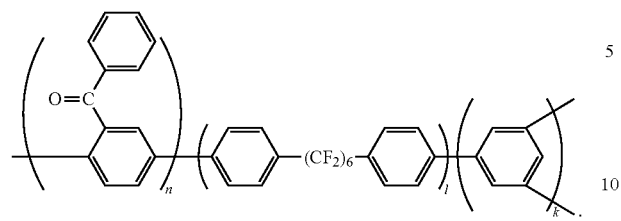
9. A membrane electrode assembly for a solid polymer electrolyte fuel cell comprising the copolymer electrolyte of claim 1.
10. A solid polymer electrolyte fuel cell comprising the copolymer electrolyte of claim 1.
* * * * *